Patented June 10, 1952

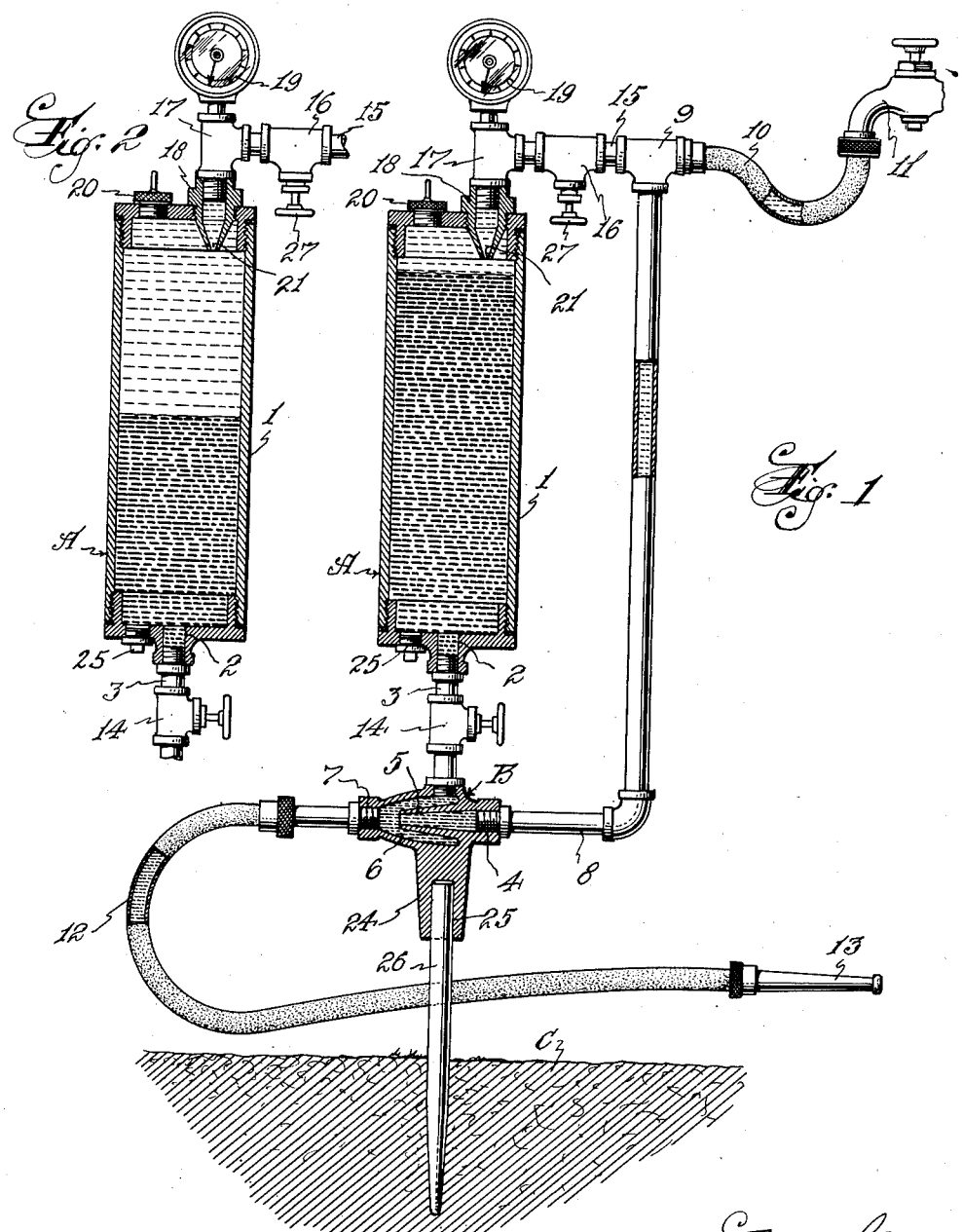

2,599,678

UNITED STATES PATENT OFFICE 2,599,678.

SPRAYING APPARATUS

Walter Walker, Short Hills, N. J.

Application May 11, 1949, Serial No. 92,604

2 Claims. (Cl. 299—83)

This invention relates in general to apparatus for spraying vegetation with solutions of insecticides or fungicides or for fertilizing lawns and shrubs and which can also be utilized for spraying cattle and farm animals with various solutions. The apparatus is suitable for use in home gardens and grounds, on country estates and golf courses, and is operable with water under pressure from a water distribution system of a city or town.

One object of the invention is to provide a spraying apparatus which shall include novel and improved means whereby a stream of water from for example the water system of a town, may be caused to withdraw from a container a substantially uniform proportion of a spraying solution, for example a water emulsion of an insecticide, and thereafter the mixture may be conducted through a hose to the spraying point.

Another object is to provide spraying apparatus of this character which shall also include means for at will shutting off the supply of spraying solution and for permitting the spraying of clear water unmixed with the spraying solution.

A further object is to provide spraying apparatus whereby a concentrated solution of for example an insecticide or a fertilizer may be mixed automatically and without special care of the operator with water from for example a city water system to produce a spraying mixture of predetermined dilution.

Other objects, advantages and results of the invention will be brought out by the following description in conjunction with the accompanying drawing in which Figure 1 is a composite side elevational and central vertical longitudinal sectional view through spraying apparatus embodying the invention, showing the relationship of the clear water and the concentrated spraying solution shortly after the start of the spraying operation; and, Figure 2 is a fragmentary central vertical longitudinal sectional view similar to Figure 1 showing the supply of spraying solution concentrate about half exhausted.

Specifically described the illustrated embodiment of the invention, the apparatus includes a container or tank A for a concentrated spraying solution 1, for example a concentrated solution of an insecticide or a fertilizer, the container having an outlet 2 at its lower end connected by a valved pipe 3 to a suction-T or injector B of generally known construction which has an inlet 4 leading through a coaxial frusto-conical passage 5 into a mixing chamber 6 that has an outlet 7 spaced from an in coaxial alignment with the frusto-conical passage 5. The inlet 4 is connected by a pipe 8 and a T-fitting 9 to a hose or other suitable conduit 10 which is in turn connected to an outlet valve 11 of a water supply system. The outlet 7 of the suction-T is connected in any suitable manner to a hose or other suitable conduit 12 at the outer end of which is a nozzle 13 of proper construction to perform the desired spraying or liquid distributing operation. The pipe 3 has a manually operable valve 14 connected therein for controlling the flow of liquid from the container A into the suction-T, and a pipe 15 having a manually operable valve 16 therein connects the water supply pipe at the T-fitting 9 to a T-fitting 17 one arm of which is connected to an inlet bushing 18 in the upper end of the container A. The other arm of the T-fitting 17 is connected to a suitable pressure gauge 19. At the upper end of the container A is also a filling plug 20 which may be moved for the purpose of filling the container with a spraying solution.

With this construction, it will be observed that with the container A filled with liquid and both valves 14 and 16 open, liquid will flow from the tank through the suction-T B and be discharged from the nozzle 13, and simultaneously water will flow from the supply valve 11 into the container. In accordance with the invention, the inlet bushing 18 has a restricted passage 21 leading into the container A whose size is so related to the cross sectional area or capacity of the outlet from the container and through the nozzle, that the spraying solution 1 withdrawn from the container continuously will be replaced by water flowing into the container through the passage 21, whereby the container will be continuously filled with liquid under pressure during operation of the apparatus. During the operation, generally the water pressure at the inlet 21 will be about two pounds greater than the pressure at the nozzle 13.

As a specific example, the apparatus is shown of a size to disperse a sufficient quantity of insecticide for one half acre at any normal household water pressure, for example twenty pounds per square inch. The container A is shown as having a capacity of about one quart and the water inlet passage 21 has a diameter of about twenty-four thousandths inches (.024″). The solution concentrate 1 in the container when mixed with water at the suction-T will produce about sixty-five gallons of spraying mixture of the proper dilution. Obviously the strength of the spraying mixture may be varied by varying the strength of the concentrate 1. With twenty pound water supply pressure, said sixty-five gallons of spraying mixture can be distributed in about twenty-one minutes, while operating at a water supply pressure of ten pounds, approximately thirty minutes would be required to disperse the sixty-five gallons.

Now specifically describing the operation of the apparatus and assuming that the container A is empty, the valves 14 and 16 first should be closed, after which the container A should be filled with the spraying concentrate through the filling opening 20 after which the filling plug should be replaced and tightened. Then the water supply valve 16 should be fully opened and the water supply valve 11 should be opened also and regulated until the desired pressure is registered at the gauge 19 with the nozzle 13 fully opened. Then the valve 14 should be opened first slowly and then fully. Thereafter the spraying mixture will be forced from the nozzle 13, and the concentrate withdrawn from the container A will be continuously replaced by water flowing into the container to the passage 21, as indicated by the light and heavy broken lines, respectively, in Figures 1 and 2.

Any suitable insecticides or fungicides may be sprayed with the apparatus, for example DDT, Rotonone, Chlordane, 2,4D which is a weed killer, as well as fertilizers. In actual practice, preferably the spraying concentrate will be prepared at the proper strength and sold to the owner of the apparatus for dilution and use as above described.

For convenience in use, the suction-T may have a foot extension 22 provided with a socket 23 to fit over the end of a stake 24 which may be driven into the ground C for supporting the apparatus as shown in Figure 1 of the drawing. While the parts may be arranged in different ways, preferably, the container A will be disposed vertically as shown with the water supply pipe 3 extending along one side of the container. In this way the water supply pipe and the container in effect mutually support each other on the suction-T B, and the valves 14 and 16 are partially protected against accidental blows. Preferably a drain plug 25 is provided at the bottom of the container A.

It will be understood by those skilled in the art that the apparatus may be used for mixing other liquids than those specifically described, for example a fire extinguishing solution, one of the liquids to be mixed being placed in the container A and the other liquid being forced through the inlet 21 of the container and the inlet 4 of the mixing device B. When using the apparatus as a fire extinguisher, the inlet opening 21 should be larger, for example thirty-two to thirty-four thousandths of an inch (.032"–.034") in diameter, so as to produce a more concentrated mixture at the outlet nozzle. The size of the inlet opening 21 may be varied as desired to obtain other proportions of the two liquids.

Various other changes in construction and modifications in the relationship and form of the liquid passages may be made within the spirit and scope of the invention.

I claim:
1. A spraying apparatus comprising a container to hold a liquid concentrate under pressure and having an inlet opening at its upper end and an outlet opening at its lower end, a mixing device having a mixing chamber connected to said outlet opening of the container, said chamber having an inlet passage for another liquid to be mixed with the liquid concentrate from said container, and also having an outlet for the liquid mixture, means for connecting said inlet opening of the container and said inlet passage of said mixing device to a common source of liquid supply, and a distributing nozzle connected to said outlet of the mixing chamber, said inlet opening being located above the level of said concentrate in the container and the capacity of said inlet opening being so related to the capacity of said outlet opening that the concentrate withdrawn through said outlet opening from the container is constantly and completely replaced by a liquid entering said inlet opening of the container and said liquid mixture is discharged from said outlet opening of said container at substantially uniform strength until said concentrate is substantially exhausted from said container.

2. Spraying apparatus as defined in claim 8 wherein said mixing device is a suction-T whose inlet passage is frusto-conical and extends coaxially into said mixing chamber in spaced and opposed relation to said outlet of the mixing chamber, said inlet of said mixing device is connected to said inlet opening of the container by a pipe that extends along one side of said container exteriorally thereof, and there is means for connecting said pipe to said source of liquid supply, with the addition of a valve between said pipe and said inlet opening of the container and a valve controlling communication between said outlet opening of the container and said mixing chamber.

WALTER WALKER.

REFERENCES CITED

The following references are of record in the file of this patent:

UNITED STATES PATENTS

| Number | Name | Date |
| --- | --- | --- |
| 1,111,689 | Dolan | Sept. 22, 1914 |
| 1,763,374 | Schrader | June 10, 1930 |
| 2,033,427 | Guildford | Mar. 10, 1936 |
| 2,044,557 | Alvord | June 16, 1936 |
| 2,044,821 | Urban | June 23, 1936 |
| 2,057,785 | Milburn | Oct. 20, 1936 |
| 2,231,782 | Thompson | Feb. 11, 1941 |
| 2,310,051 | Baer | Feb. 2, 1943 |
| 2,323,341 | McGill | July 6, 1943 |